United States Patent Office
3,524,658
Patented Aug. 18, 1970

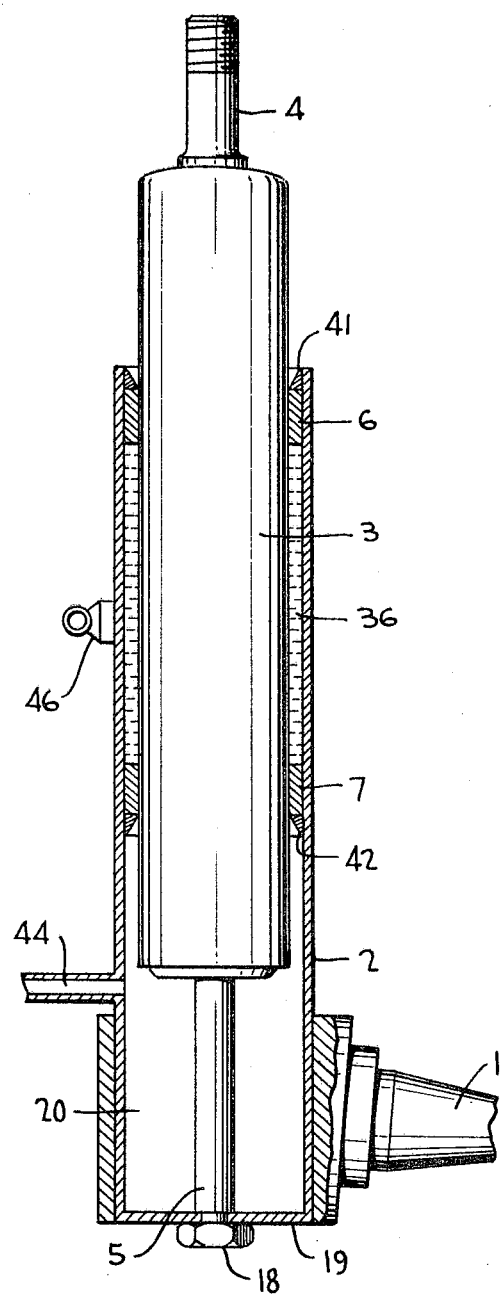

3,524,658
SHOCK ABSORBERS
Christian Bourcier de Carbon, 64 Boulevard Maurice-Barres, Neuilly-sur-Seine, France
Filed Sept. 12, 1968, Ser. No. 759,441
Claims priority, application Germany, Sept. 14, 1967, 1,630,168
Int. Cl. B60g 11/26
U.S. Cl. 280—124                                    3 Claims

ABSTRACT OF THE DISCLOSURE

An elastic damping suspension of the type including a guiding tube surrounding a shock absorber, and wherein lubrication is effected by the provision of a lubricating paste or viscous liquid carried by said tube, between upper and lower guide rings. Packing rings seal the joints between the shock absorber cylinder and the guiding tube and the one nearer the outer end of the tube acts as a scraper for the exclusion of dirt. The inner end of the tube may comprise a chamber for compressed gas, and in that case, the lower packing ring acts as a separator between the gas chamber and the lubricant space.

---

This invention relates to damping suspensions for the wheel assemblies of motor vehicles, and more particularly, to those which include a telescoping piston and cylindert shock absorber, and a guide tube for the cylinder thereof.

The principal object of the invention is to provide a novel and improved suspension of this type which introduces certain packing features for lubricant disposed between the shock absorber and the walls of the guide tube.

Other objects and features of novelty will be apparent from the following specification when read in connection with the accompanying drawing in which one embodiment of the invention is illustrated by way of example.

The single figure of drawing comprises a view partly in elevation and partly in vertical section.

My prior application, Ser. No. 713,080, filed Mar. 14, 1968, for the suspension devices of vehicle wheels intended to assure vertical guiding of the wheel in relation to the chassis by the sliding of the tube of a telescopic shock absorber in an outside guiding coaxial tube to the bottom of which is attached the rod of the shock absorber, the upper end of the tube of the shock absorber being attached to the chassis, while the lower end of the guide tube is connected to the chassis by means of swinging arms, said lower end carrying, in addition, the axle of the wheel, and this suspension apparatus being improved by a device for lubricating the rubbing parts during sliding of the two tubes in one another.

In the preferred embodiment described in that application, lubricating of the rubbing parts was obtained by an oil reserve placed in the lower part of the outside tube, a part of this oil being constantly carried by pumping due to the relative movement between the tube of the shock absorber and the guide tube, to the points of friction between said tubes, preferably by a lubricating tube whose end is immersed in the oil reserve and whose other end brings the oil by pumping to the upper part of the guide tube to be carried there. According to a particular embodiment described in that application, a fluid-tight joint was provided between the upper end of the guide tube and the shock absorber tube which comes out therefrom to make fluid-tight the free space between the lower part of the guide tube and the shock absorber tube, this free space capable of being filled with gas under pressure to obtain a pneumatic spring supporting the load of the vehicle in part or completely, said pneumatic spring being, if desired, connected to a position correcting device, making it possible to regulate the gas pressure depending on the load of the vehicle.

In the development of such a suspension, it was found that it was particularly simple, especially when it was desired to use the position correcting device described above, to place the lubricating oil reserve directly in the annular space 36 between guide rings 6 and 7 and by filling the annular space thus enclosed between guide rings 6 and 7 and tubes 2 and 3 with oil or lubricating grease.

Upper joint 41, located on the outside, then acts especially as a scraper intended, on the one hand, to protect guide ring 6 from outside dirt, and, on the other hand, to prevent an outward leaking of the lubricant; while inside joint 42, particularly well protected, assures gas tightness and the separation of the gas of chamber 20 and of the lubricant of annular chamber 36.

This arrangement permits the elimination of the piping for pumping the oil described in the prior application as a preferred embodiment of the process of lubricating the parts in movement. It is particularly advantageous in the case where a gas pressure is used in chamber 20 to support the load of the vehicle in part or in whole, but this arrangement can also be used when the suspension spring is a simple metal spring completely supporting the weight of the vehicle.

By way of example and to make understanding of the following description easier, there has been shown on the accompanying drawing an elevation and section of a suspension according to the invention.

By referring to this figure, it can be seen that the suspension is made up of a guide tube 2 which is in one piece with wheel axle 1. Tube 3 of the shock absorber is guided in said guide tube 2 by rings 6 and 7 which can be coated with a layer of antifriction material. The rod of the shock absorber 5 is attached to bottom 19 of guide tube 2 by screw 18. Attachment to the vehicle chassis is effected by the threaded rod 4 which is integral with the upper end of the shock absorber. Next to each guide ring 6, and 7, is provided a fluid-tight joint. Joint 41 placed at the upper end of the guide tube, is of the scraper type intended to prevent the entry of dirt from the outside atmosphere and to prevent leaks of the lubricant with which annular space 36 is filled. Joint 42, placed toward free space 20, is larger, since fluid tightness should be assured against leaks of lubricant in annular space 36, but it should also possibly assure fluid tightness against the gases under pressure that are in space 20 forming the pneumatic spring chamber.

Because of the arrangement of joints 41 and 42, the suspension is therefore lubricated for life, but in certain cases it is possible to provide a grease box 46 making it possible to renew periodically the lubricant in annular space 36. Space 20 can be connected by conduit 44 to a position correcting device, not shown, making it possible to regulate the pressure of the gas in space 20, depending on the load of the vehicle.

It is of course understood that the invention is not limited to the case where space 20 is used as the pneumatic spring chamber but it also applies to an elastic brace with a metal spring, for example.

What I claim is:
1. A cushioned elastic suspension for suspension devices of vehicle wheels intended to assure vertical guidance of the wheel in relation to the chassis by the sliding of a telescopic shock absorber tube in an outside coaxial guide tube, to the bottom of which is attached the shock absorber rod, the upper end of said shock absorber being rigid with the chassis, while the lower end of the guide tube is connected with the chassis by means of swinging arms, said lower end comprising in addition the axle of the wheel, characterized by the fact that two fluid-tight joints are placed on both sides of two guide rings attached in the outside tube; the first joint, a scraper type, being at the upper end of the guide tube, intended to protect the guide ring from outside dirt and to prevent outward leaks of the lubricant, the second joint being placed in the vicinity of the lower end of the shock absorber tube so as to make fluid-tight the free space between the lower part of the guide tube and the shock absorber tube and to prevent a leak of the lubricant toward the free space, the space between the two guide rings being at least partially filled with lubricant in the form of a paste or viscous liquid.

2. Cushioned elastic suspension according to claim 1, characterized by the fact that the gas under pressure is contained in the space enclosed between the outside guide tube and the shock absorber tube, so as to support at least partially the load of the vehicle.

3. Cushioned elastic suspension according to claim 2, characterized by the fact that the pneumatic spring thus provided is connected to a position correcting device making it possible to regulate the gas pressure, depending on the load of the vehicle.

References Cited

UNITED STATES PATENTS 3,019,029  1/1962  Sampietro ---------- 280—124

PHILIP GOODMAN, Primary Examiner

U.S. Cl. X.R.

267—64